United States Patent
Dong et al.

(10) Patent No.: US 10,317,935 B2
(45) Date of Patent: Jun. 11, 2019

(54) ELECTRONIC APPARATUS

(71) Applicants: BEIJING LENOVO SOFTWARE LTD., Beijing (CN); LENOVO (BEIJING) LIMITED, Beijing (CN)

(72) Inventors: Shujie Dong, Beijing (CN); Jun Zhang, Beijing (CN)

(73) Assignees: BEIJING LENOVO SOFTWARE LTD., Beijing (CN); LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 14/638,563

(22) Filed: Mar. 4, 2015

(65) Prior Publication Data

US 2016/0048157 A1    Feb. 18, 2016

(30) Foreign Application Priority Data

Aug. 18, 2014   (CN) .......................... 2014 1 0406753

(51) Int. Cl.
| | |
|---|---|
| *G06F 1/16* | (2006.01) |
| *F16M 11/24* | (2006.01) |
| *F16M 11/04* | (2006.01) |
| *F16M 11/10* | (2006.01) |
| *F16M 13/00* | (2006.01) |

(52) U.S. Cl.
CPC ......... *G06F 1/1601* (2013.01); *F16M 11/041* (2013.01); *F16M 11/10* (2013.01); *F16M 11/24* (2013.01); *F16M 13/005* (2013.01); *G06F 1/1626* (2013.01); *G06F 1/1654* (2013.01)

(58) Field of Classification Search
CPC .... G06F 1/1601; F16M 11/10; F16M 11/041; F16M 13/005; F16M 11/24
USPC ...................................................... 361/679.21
See application file for complete search history.

(56) References Cited

U.S. PATENT DOCUMENTS

| | | | |
|---|---|---|---|
| 6,010,111 A * | 1/2000 | Cho | F16M 11/10 248/346.06 |
| 6,359,994 B1 * | 3/2002 | Markow | G06F 1/1616 361/679.41 |
| 6,381,128 B1 * | 4/2002 | Kramer | G06F 1/1624 312/223.1 |
| 7,570,160 B2 * | 8/2009 | Kim | 340/545.6 |

(Continued)

FOREIGN PATENT DOCUMENTS

| | | |
|---|---|---|
| CN | 102445956 A | 9/2010 |
| CN | 202349525 U | 11/2011 |

(Continued)

OTHER PUBLICATIONS

Eng. Abstract of CN 202349525 (1 pg.).

(Continued)

*Primary Examiner* — Rockshana D Chowdhury (57) ABSTRACT

The present application discloses an electronic apparatus comprising a body, a rotary connection device, a bracket and a base, wherein, the bracket is rotatably connected to the body via the rotary connection device; the base is detachably connected to the body via the bracket. The electronic apparatus is in a first use mode when the body is connected to the base via the bracket. The electronic apparatus is in a second use mode when the base is detached from the bracket. The second use mode is different from the first use mode.

12 Claims, 6 Drawing Sheets

(56) References Cited

U.S. PATENT DOCUMENTS

| | | | | |
|---|---|---|---|---|
| 7,595,978 B2* | 9/2009 | Chen | ...................... | F16M 11/10 |
| | | | | 361/679.06 |
| 7,766,288 B2* | 8/2010 | Kim | .................... | F16M 11/105 |
| | | | | 248/176.1 |
| 8,047,489 B2* | 11/2011 | Watanabe | ............ | F16M 11/041 |
| | | | | 248/274.1 |
| 8,408,502 B2* | 4/2013 | Watanabe | ............ | F16M 11/041 |
| | | | | 248/121 |
| 2006/0117623 A1* | 6/2006 | Watanabe | .............. | F16M 11/00 |
| | | | | 40/606.15 |
| 2006/0168865 A1* | 8/2006 | Watanabe | ............ | F16M 11/041 |
| | | | | 40/745 |
| 2013/0314300 A1* | 11/2013 | Moscovitch | ........... | F16M 11/04 |
| | | | | 345/1.3 |

FOREIGN PATENT DOCUMENTS

| | | |
|---|---|---|
| CN | 101034593 A | 7/2012 |
| CN | 202371397 U | 8/2012 |

OTHER PUBLICATIONS

Eng. Abstract of CN 202371397 (1 pg.).
Eng. Abstract of CN 101034593 (1 pg.).
English Abstract of CN 102445956 (1 pg.).
English Abstract of CN 202349525 (1 pg.).

* cited by examiner

ELECTRONIC APPARATUS

CROSS-REFERENCE TO RELATED APPLICATION

This application claims the benefit of Chinese Patent Application No. 201410406753.2 filed on Aug. 18, 2014 in the State Intellectual Property Office of China, the whole disclosure of which is incorporated herein by reference.

BACKGROUND

Technical Field

The present application generally relates to a terminal apparatus, and particularly, to an electronic apparatus.

Description of the Related Art

Currently, when an all-in-one computer is used by a user, the all-in-one computer is generally placed on a supporting surface through a bracket of the all-in-one computer. That is, the bracket of the all-in-one computer is only used to provide a support function. Thus, the bracket of all-in-one computer only has a single function, and thereby cannot satisfy requirements of the user in some use occasions and thus adversely affect use experience of the user.

SUMMARY

The present application provides an electronic apparatus. The electronic apparatus comprises a body, a rotary connection device, a bracket rotatably connected to the body via the rotary connection device; and a base detachably connected to the body via the bracket.

DETAILED DESCRIPTION OF EMBODIMENTS

The present application will be further described hereinafter in detail with reference to the attached drawings and exemplary embodiments.

First Embodiment

Figure 1:
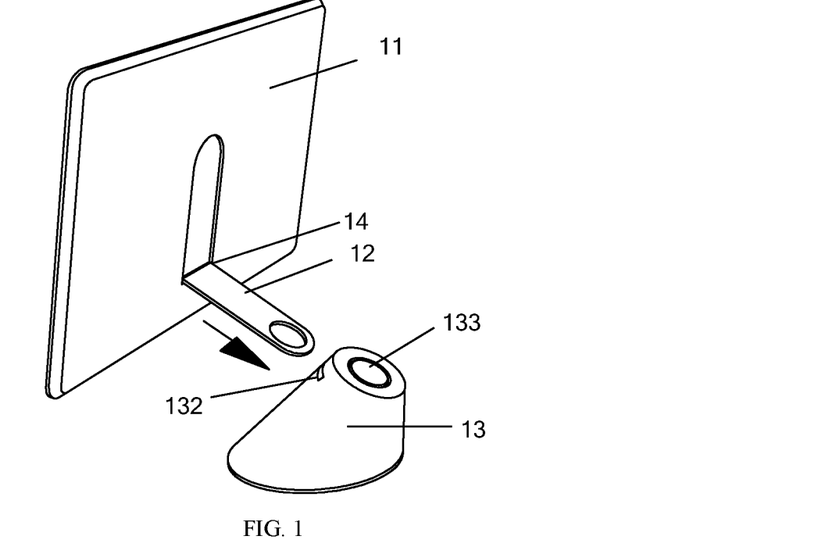
FIG. 1 is a first schematic view showing a constituent structure of an electronic apparatus according to embodiments of the present application.

This embodiment provides an electronic apparatus, as shown in FIG. 1, comprising: a body 11, a rotary connection device 14, a bracket 12, and a base 13. The bracket 12 is connected to the body 11 via the rotary connection device 14. The body 11 is connected to the base 13 via the bracket 12; or the body 11 is detached from the base 13 via the bracket 12. The electronic apparatus is in a first use mode when the body 11 is connected to the base 13 via the bracket 12. The electronic apparatus is in a second use mode when the body 11 is detached from the base 13 via the bracket 12. The second use mode is different from the first use mode.

When the electronic apparatus is in the second use mode, the bracket and the base are in a separate state, the body and the bracket are in a connection state, and an angle between the body and the bracket is a first preset angle; when the electronic apparatus is in the first use mode, the bracket and the base are in a connection state, and the angle between the body and bracket may be a second preset angle.

The electronic apparatus according to this embodiment may be applied in the following use occasions: when a user is going out, or wishes to use the electronic apparatus in a portable way, only the body and the bracket of the electronic apparatus are used. At this time, the electronic apparatus is controlled to be in a second use state. As such, mobility can be ensured for the user, and the electronic apparatus can be used conveniently; when the user wishes to use the electronic apparatus in a fixed place, the body is connected to the base via the bracket, and the electronic apparatus is controlled to be in a first use state so that it can be used stably.

Accordingly, when the electronic apparatus is used, the body can not only be supported by the bracket, but also be connected to the base via the bracket according to use demands, so that the electronic apparatus has two use modes, thereby the electronic apparatus can not only satisfy use occasions requiring convenience and mobility, but also ensure that an angle of view in operation of the electronic apparatus is controlled to comply with requirements of comfort of the user.

Second Embodiment

This embodiment provides an electronic apparatus, as shown in FIG. 1, comprising: a body 11, a rotary connection device 14, a bracket 12, and a base 13.

The bracket 12 is connected to the body 11 via the rotary connection device 14.

The body 11 is connected to the base 13 via the bracket 12; or the body 11 is detached from the base 13 via the bracket 12.

The electronic apparatus is in a first use mode when the body 11 is connected to the base 13 via the bracket 12.

The electronic apparatus is in a second use mode when the body 11 is detached from the base 13 via the bracket 12.

The second use mode is different from the first use mode.

Specifically, the bracket is configured to deploy at a first preset angle relative to the body for supporting the body on a supporting surface when the body is detached from the base via the bracket; the bracket is further configured to deploy at a second preset angle relative to the body for supporting the body on the supporting surface in cooperation with the base when the body is connected to the base via the bracket.

The supporting surface may be a place where the electronic apparatus is placed, for example, may be a desktop or ground.

The bracket is configured to deploy at the first preset angle relative to the body by means of the rotary connection device when the body is detached from the base via the bracket; and the bracket is further configured to deploy at the second preset angle relative to the body by means of the rotary connection device when the body is connected to the base via the bracket.

Figure 2:
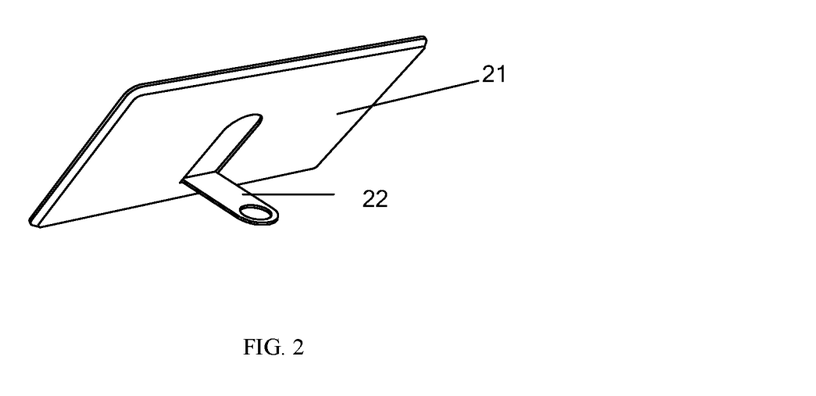
FIG. 2 is a second schematic view showing a constituent structure of the electronic apparatus according to embodiments of the present application.
Figure 3:
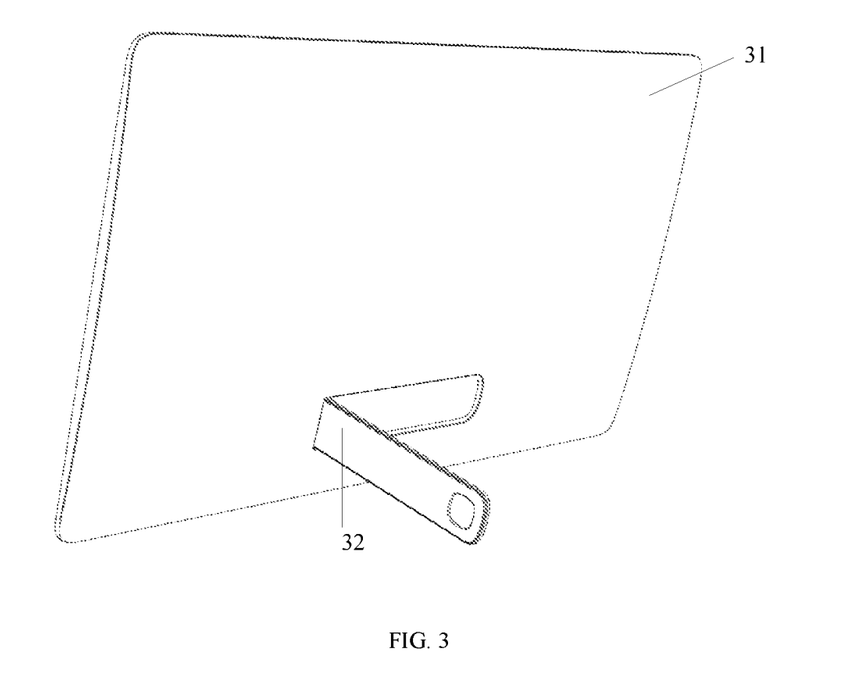
FIG. 3 is a third schematic view showing a constituent structure of the electronic apparatus according to embodiments of the present application.
Figure 4:
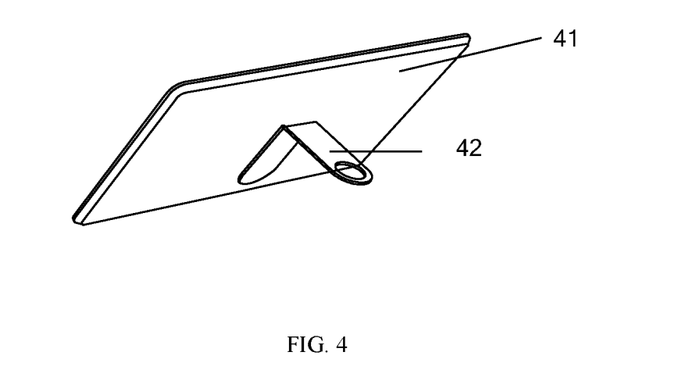
FIG. 4 is a fourth schematic view showing a constituent structure of the electronic apparatus according to embodiments of the present application.

The electronic apparatus according to this embodiment may be applied in the following use occasions:

when the electronic apparatus is in the first use state, the body and the bracket of the electronic apparatus may be in a physical configuration as shown in FIG. 2, in which the bracket is detached from the base; the bracket 22 is connected to a lower portion of the body 21 via the rotary connection device; a second end of the bracket 22 deploys downwards and forms a first preset angle relative to the body 21; or, the body and the bracket of the electronic apparatus may be in a physical configuration as shown in FIG. 3, in which the bracket 32 is connected at one side of the lower portion of the body 31; the bracket 32 deploys laterally and forms a first preset angle relative to the body; or, the body and the bracket of the electronic apparatus may be in a physical configuration as shown in FIG. 4, in which the bracket 42 is connected to a middle portion of an upper portion of the body 41 via the rotary connection device; the second end of the bracket 42 deploys upwards and forms a first preset angle relative to the body 41. It can be understood that when the electronic apparatus is in the first use state, the body and the bracket of the electronic apparatus may be in a physical configuration in which the bracket abuts on the body. At this time, the body can be laid flat on the supporting surface.

Figure 5:
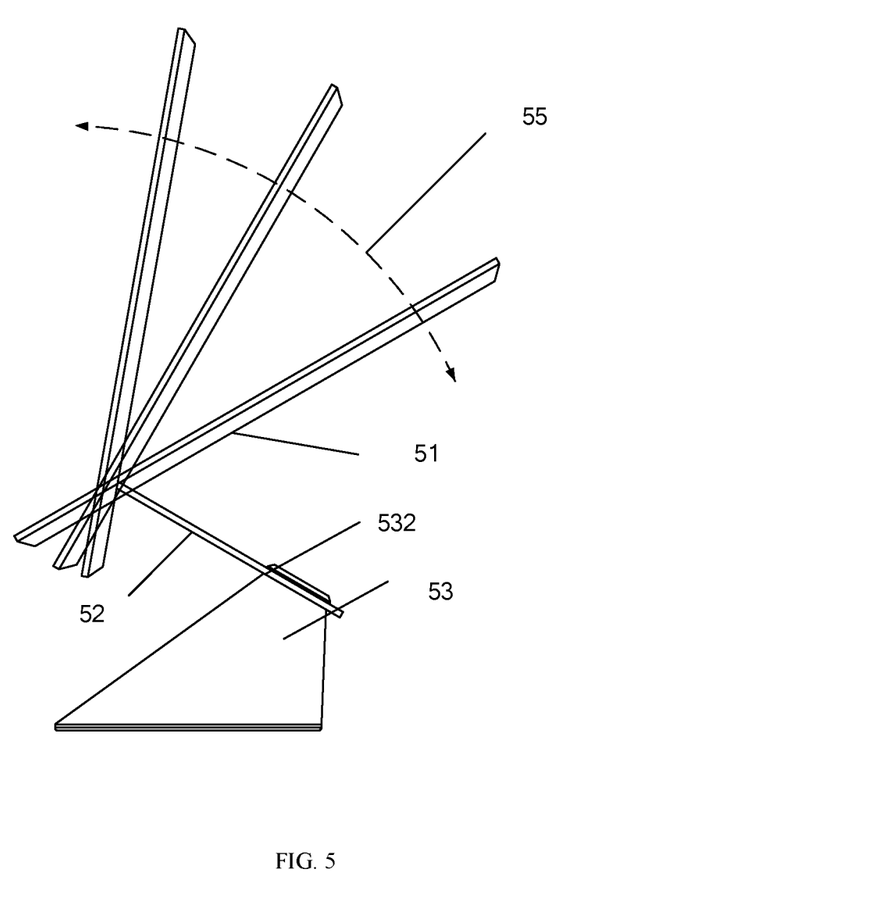
FIG. 5 is a first schematic view showing adjustment of an angle of a body of the electronic apparatus according to embodiments of the present application.
Figure 6:
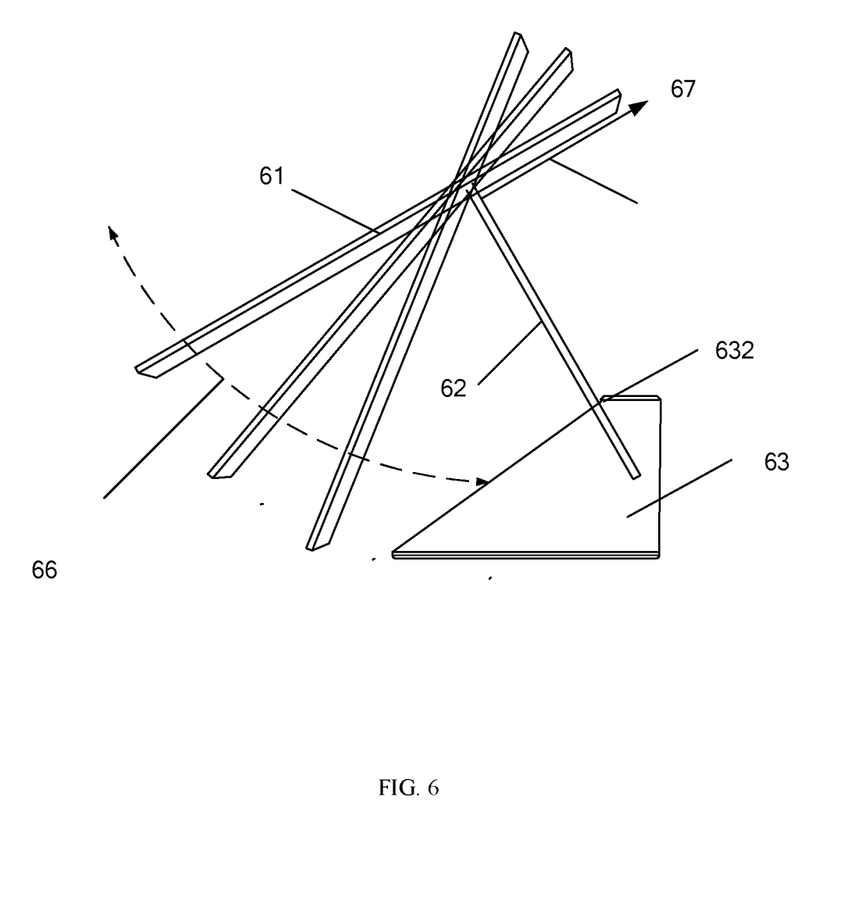
FIG. 6 is a second schematic view showing adjustment of an angle of a body of the electronic apparatus according to embodiments of the present application.

When the electronic apparatus is in a second use state, the body, the bracket, the rotary connection device and the base of the electronic apparatus may be in a physical configuration as shown in FIG. 5, in which the bracket is connected to the base; the bracket 52 is connected to a lower portion of the body 51 via the rotary connection device; the bracket 52 deploys at a second preset angle 55 relative to the body 51; or, the body, the bracket, the rotary connection device and the base of the electronic apparatus may be in a physical configuration as shown in FIG. 6, in which the bracket 62 is connected to a middle portion of an upper portion of the body 61 via the rotary connection device; the bracket 62 deploys at a second preset angle relative to the body 61 when the bracket is connected to the base 63; or, the bracket is connected at one side of the lower portion of the body, the bracket deploys laterally to form the second preset angle with respect to the body.

Accordingly, when the electronic apparatus is used, not only the body can be supported by the bracket, but also the body can be connected to the base via the bracket according to use demands, thereby use occasions of the bracket are increased, so that the electronic apparatus can not only satisfy use occasions requiring convenience and mobility, but also ensure that an angle of view in operation of the electronic apparatus is controlled to comply with requirements of comfort of the user.

Third Embodiment

This embodiment provides an electronic apparatus, as shown in FIG. 1, comprising: a body 11, a rotary connection device 14, a bracket 12, and a base 13.

The bracket 12 is connected to the body 11 via the rotary connection device 14.

The body 11 is connected to the base 13 via the bracket 12; or the body 11 is detached from the base 13 via the bracket 12.

The electronic apparatus is in a first use mode when the body 11 is connected to the base 13 via the bracket 12.

The electronic apparatus is in a second use mode when the body 11 is detached from the base 13 via the bracket 12.

The second use mode is different from the first use mode.

Specifically, the bracket is configured to deploy at a first preset angle relative to the body for supporting the body on a supporting surface when the body is detached from the base via the bracket; the bracket is further configured to deploy at a second preset angle relative to the body for supporting the body on the supporting surface in cooperation with the base when the body is connected to the base via the bracket.

The supporting surface may be a place where the electronic apparatus is placed, for example, may be a desktop or ground.

The bracket is configured to deploy at the first preset angle relative to the body by means of the rotary connection device when the body is detached from the base via the bracket; and the bracket is further configured to deploy at the second preset angle relative to the body by means of the rotary connection device when the body is connected to the base via the bracket.

When the body is connected to the base via the bracket, the bracket deploys at the second preset angle relative to the body by means of the rotary connection device, and maintains at the second preset angle between the bracket and the body with a friction force provided by the rotary connection device. The second preset angle may be an arbitrary angle set as desired.

When the electronic apparatus is in the first use state, the body and the bracket of the electronic apparatus may be in a physical configuration as shown in FIG. 3, in which the bracket 32 is connected at one side of the lower portion of the body 31; the bracket 32 deploys laterally and forms a first preset angle relative to the body; or, the body and the bracket of the electronic apparatus may be in a physical configuration as shown in FIG. 4, in which the bracket 42 is connected to a middle portion of an upper portion of the body 41 via the rotary connection device; the second end of the bracket 42 deploys upwards at a first preset angle relative to the body 41. It can be understood that when the electronic apparatus is in the first use state, the body and the bracket of the electronic apparatus may be in a physical configuration in which the bracket abuts on the body. At this time, the body can be laid flat on the supporting surface.

When the electronic apparatus is in the second use state, the body, the bracket, the rotary connection device and the base of the electronic apparatus may be in a physical configuration as shown in FIG. 6, in which the bracket 62 is connected to a middle portion of an upper portion of the body 61 via the rotary connection device; the bracket 62 deploys at a second preset angle relative to the body 61 when the bracket is connected to the base 63. At this occasion, the rotary connection device provides a friction force for the bracket, and the direction of the friction force is upward along the direction of the body, as shown by an arrow 67.

Alternatively, the bracket is connected at one side of the lower portion of the body, and deploys laterally at a second preset angle relative to the body. At this time, when the body is connected to the base via the bracket, the rotary connection device is configured to provide the friction force to maintain the second preset angle between the bracket and the body, which is an arbitrary angle set as desired, and the bracket is configured to provide a supporting force to maintain the second preset angle between the bracket and the body, the direction of the supporting force being perpendicular to the direction of friction force. Specifically, the direction of the friction force provided by the bracket by means of the rotary connection device is a transverse direction, i.e., a horizontal direction, while the direction of the supporting force provided by the bracket is a vertical direction, i.e., an upright direction. Thus, when the bracket deploys laterally, directions of the friction force and the supporting force on the body are perpendicular to each other.

Accordingly, when the electronic apparatus is used, not only the body can be supported by the bracket, but also the body can be connected to the base via the bracket according to use demands, thereby use occasions of the bracket are increased, so that the electronic apparatus can not only satisfy use occasions requiring convenience and mobility, but also ensure that an angle of view in operation of the electronic apparatus is controlled to comply with requirements of comfort of the user.

Fourth Embodiment

This embodiment provides an electronic apparatus, as shown in FIG. 1, comprising: a body 11, a rotary connection device 14, a bracket 12, and a base 13.

The bracket 12 is connected to the body 11 via the rotary connection device 14;

The body 11 is connected to the base 13 via the bracket 12; or the body 11 is detached from the base 13 via the bracket 12;

The electronic apparatus is in a first use mode when the body 11 is connected to the base 13 via the bracket 12;

The electronic apparatus is in a second use mode when the body 11 is detached from the base 13 via the bracket 12.

The second use mode is different from the first use mode.

Specifically, the bracket is configured to deploy at a first preset angle relative to the body for supporting the body on a supporting surface when the body is detached from the base via the bracket; the bracket is further configured to deploy at a second preset angle relative to the body for supporting the body on the supporting surface in cooperation with the base when the body is connected to the base via the bracket.

The supporting surface may be a place where the electronic apparatus is placed, for example, may be a desktop or ground.

The bracket is configured to deploy at the first preset angle relative to the body by means of the rotary connection device when the body is detached from the base via the bracket; and the bracket is further configured to deploy at the second preset angle relative to the body by means of the rotary connection device when the body is connected to the base via the bracket.

The center of gravity of the whole electronic apparatus falls within a bottom area of the base when the body is connected to the base via the bracket. As such, it can be ensured that when the body deploys relative to bracket at any angle as the second preset angle, the electronic apparatus can be placed on the supporting surface by means of the base stably.

When the electronic apparatus is in the first use state, the body and the bracket of the electronic apparatus may be in a physical configuration as shown in FIG. 2, in which the body is detached from the base via the bracket; the bracket 22 is connected to a lower portion of the body 21 via the rotary connection device; a second end of the bracket 22 deploys downwards and forms a first preset angle relative to the body 21. At this time, a friction force is provided by the rotary connection device so that the bracket and the body maintains at the first preset angle, which can be an arbitrary angle, and the friction force provided by the rotary connection device provides a supporting force by which the electronic apparatus is supported on the supporting surface while the first preset angle is maintained between the bracket and the body. It can be understood that when the electronic apparatus is in the first use state, the body and the bracket of the electronic apparatus may be in a physical configuration in which the bracket abuts on the body, and at this time, the body can be laid flat on the supporting surface.

When the electronic apparatus is in a second use state, the body, the bracket, the rotary connection device and the base of the electronic apparatus may in a physical configuration as shown in FIG. 5 in which when the body is connected to the base via the bracket, the bracket 52 is connected to a lower portion of the body 51 via the rotary connection device; the bracket 52 deploys at a second preset angle 55 relative to the body 51; a friction force is provided by the rotary connection device so that the bracket and the body maintains at the second preset angle, which is an arbitrary angle; and the friction force provided by the rotary connection device provides a supporting force by which the electronic apparatus is supported on the supporting surface while the second preset angle is maintained between the bracket and the body. The second preset angle may be an arbitrary angle within a range of 0-180 degrees, and can be adjusted according to actual use conditions.

Figure 7:
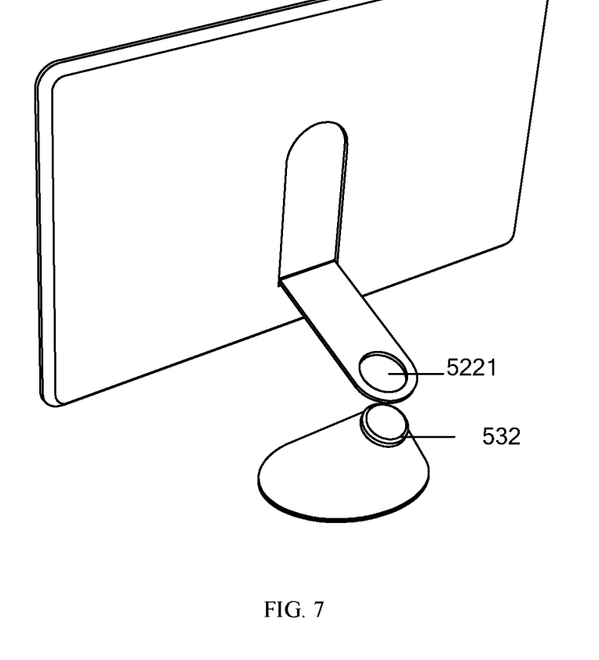
FIG. 7 is a schematic view showing a state in which a bracket is separate from a base in the electronic apparatus according to embodiments of the present application.
Figure 8:
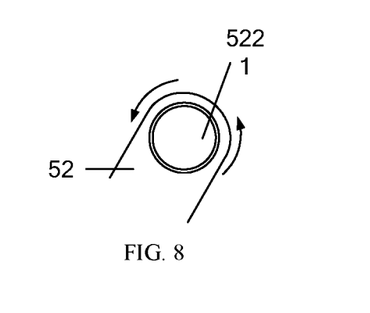
FIG. 8 is a schematic view showing connection operation of the bracket of the electronic apparatus according to embodiments of the present application.
Figure 9:
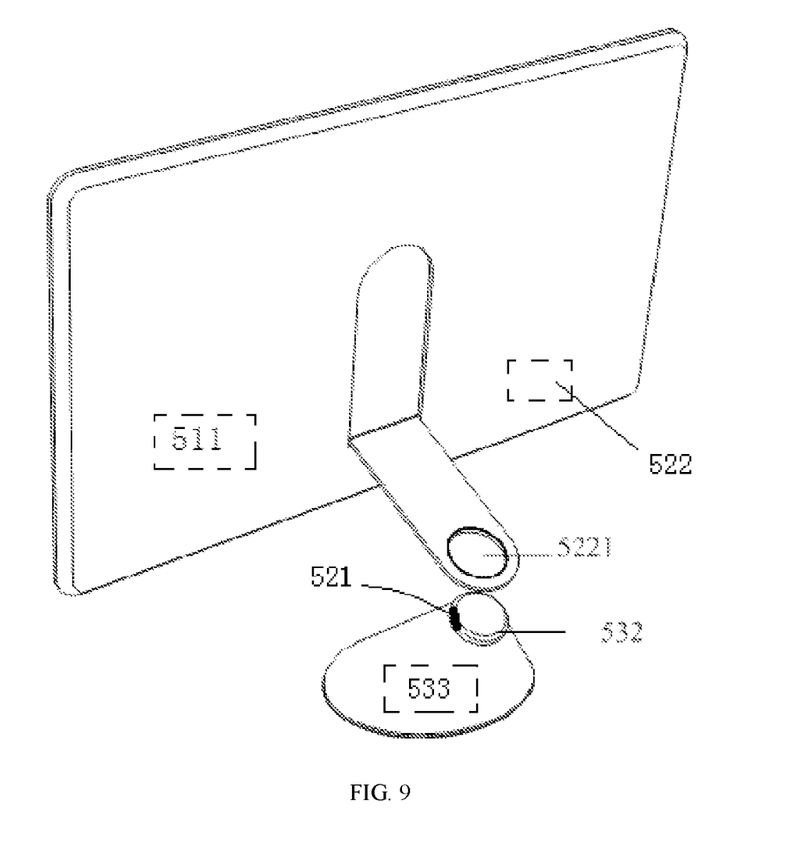
FIG. 9 is a schematic view showing a state in which a bracket is separate from a base in the electronic apparatus according to embodiments of the present application.

When the bracket deploys upwards or downward relative to the body, that is, the bracket is in an upturning or down-turning state, the body can be connected to the base via the bracket in various ways. In this embodiment, the following two ways are provided:

In a first way, as shown in FIG. 5, a connection portion 532 on the base 53 may be a rotary locking groove, which may be a circular locking groove around outside of a top portion of the base 53, as shown in FIG. 7. When the bracket is connected to the connection portion 532 through a circular hole 5221 of a second end of the bracket, the bracket 52 is rotated in a clockwise direction, as shown in FIG. 8, so that the bracket is fixed with respect to the base;

In a second way, as shown in FIG. 1, a connection portion 132 on the base 13 is a lateral or horizontal slot. The bracket 12 can be directly fixed when being inserted into the connection portion 132 of the base 13 in an arrow direction; or, a button 133 may be added on a top of the base 13, and when the bracket 12 is inserted into the connection portion 132 of the base 13 in the arrow direction, the button 133 is pressed down so that the bracket is fixed with respect to the base.

When the bracket deploys laterally relative to body, the body may be connected to and fixed relative to the base via the bracket by providing a vertical slot in the base and inserting the bracket into the connection portion (vertical slot) of the base.

Accordingly, when the electronic apparatus is used, not only the body can be supported by the bracket, but also the body can be connected to the base via the bracket according to use demands, thereby use occasions of the bracket are increased, so that the electronic apparatus can not only satisfy use occasions requiring convenience and mobility, but also ensure that an angle of view in operation of the electronic apparatus is controlled to comply with requirements of comfort of the user.

Fifth Embodiment

This embodiment provides an electronic apparatus, as shown in FIG. 1, comprising: a body 11, a rotary connection device 14, a bracket 12, and a base 13.

The bracket 12 is connected to the body 11 via the rotary connection device 14.

The body 11 is connected to the base 13 via the bracket 12; or the body 11 is detached from the base 13 via the bracket 12.

The electronic apparatus is in a first use mode when the body 11 is connected to the base 13 via the bracket 12.

The electronic apparatus is in a second use mode when the body 11 is detached from the base 13 via the bracket 12.

The second use mode is different from the first use mode.

The electronic apparatus further comprises a first detection unit and an information processing unit.

The first detection unit is configured to obtain a first detection information, which is used to determine whether or not the bracket is detached from the base in the electronic apparatus.

The information processing unit is configured to control the electronic apparatus to be in the second use mode when the first detection information indicates that the bracket is detached from the base, and to control the electronic apparatus to be in the first use mode when the first detection information indicates that the bracket is connected to the base.

The first detection unit may be located within the bracket, or within the base, or within the body. The first detection unit may be implemented as a contact type sensor. For example, when the first detection unit is located within the bracket, the first detection unit may be provided inside the circular hole 5221 at the second end of the bracket 52 as shown in FIG. 7; when the first detection unit is located within the base, the first detection unit may be provided at the connection portion on the base, or the first detection unit may be provided inside the slot 132 in the base 13 as shown in FIG. 1. When the first detection unit is located within the body, the first detection unit may be a switch, which may be disposed at a position in any one of four sides of the body.

The information processing unit may be provided within the body of the electronic apparatus.

Further, the bracket may be provided with connecting wires therein for transmitting electrical signals; a contact may be provided in the circular hole in the second end of the bracket so as to be electrically connected to a contact in the connection portion of the base. As such, electrical or communication signals from the base can be communicated with the body via the bracket.

Situations where the first detection unit is located at different positions will be described hereafter.

First situation: when the first detection unit is located within the bracket, the first detection information may be a contact signal sent from the contact type sensor. Once a contact is detected by the first detection unit such as the contact type sensor, a contact signal will be sent by the first detection unit, and transmitted to the information processing unit through connection wires within the bracket; correspondingly, the information processing unit receives the contact signal to determine that the bracket is connected to the base, and thereby control the electronic apparatus to be in the first use mode.

Second situation: when the first detection unit is located within the base, the first detection information may be a contact signal sent by the contact type sensor. Once a contact is detected by the first detection unit such as the contact type sensor, a contact signal will be sent, and the first detection unit within the base will transmit the first detection signal to the information processing unit through connection wires within the bracket; correspondingly, the information processing unit receives the contact signal to determine that the bracket is connected to the base, and thereby control the electronic apparatus to be in the first use mode.

Third situation: when the first detection unit is located within the body, the first detection unit may be a switch. At this time, once it has detected that the switch is turned on by a user, a switch signal will be sent as a first detection signal, which will be transmitted to the information processing unit; correspondingly, the information processing unit receives the first detection signal, to determine that the bracket is connected to the base, and thereby control the electronic apparatus to be in the first use mode.

Accordingly, when the electronic apparatus is used, not only the body can be supported by the bracket, but also the body can be connected to the base via the bracket according to use demands, so that the all-in-one computer can be laid flat on a platform, thereby the electronic apparatus can not only satisfy use occasions requiring convenience and mobility, but also ensure that an angle of view in operation of the electronic apparatus is controlled to comply with requirements of comfort of the user.

Sixth Embodiment

This embodiment provides an electronic apparatus, as shown in FIG. 1, comprising: a body 11, a rotary connection device 14, a bracket 12, and a base 13.

The bracket 12 is connected to the body 11 via the rotary connection device 14. The body 11 is connected to the base 13 via the bracket 12; or the body 11 is detached from the base 13 via the bracket 12.

The electronic apparatus is in a first use mode when the body 11 is connected to the base 13 via the bracket 12.

The electronic apparatus is in a second use mode when the body 11 is detached from the base 13 via the bracket 12.

The second use mode is different from the first use mode.

The electronic apparatus further comprises a first detection unit and an information processing unit.

The first detection unit is configured to obtain a first detection information, which is used to determine whether or not the bracket is detached from the base in the electronic apparatus.

The information processing unit is configured to control the electronic apparatus to be in the second use mode when the first detection information indicates that the bracket is detached from the base, and to control the electronic apparatus to be in the first use mode when the first detection information indicates that the bracket is connected to the base.

The first detection unit may be located within the bracket, or within the base, or within the body. The first detection unit may be implemented as a contact type sensor. For example, when the first detection unit is located within the bracket, the first detection unit may be provided inside the circular hole 5221 of the second end of the bracket 52 as shown in FIG. 7; when first detection unit is located within the base, the first detection unit may be provided at the connection portion on the base, or the first detection unit may be provided inside the slot 132 in the base 13 as shown in FIG.

1. When the first detection unit is located within the body, the first detection unit may be a switch, which may be provided at a position in any one of four sides of the body.

The information processing unit may be provided within the body of the electronic apparatus.

Further, the bracket may be provided with connection wires therein for transmitting electrical signals; a contact may be provided in the circular hole in the second end of the bracket so as to be electrically connected to a contact in the connection portion of the base. As such, electrical or communication signals from the base can be communicated with the body via the bracket.

Situations where the first detection unit is located at different positions will be described hereafter.

First situation: when the first detection unit is located within the bracket, the first detection information may be a contact signal sent from the contact type sensor. Once a contact is detected by the first detection unit such as the contact type sensor, a contact signal will be sent by the first detection unit, and transmitted to the information processing unit through connection wires within the bracket; correspondingly, the information processing unit receives the contact signal to determine that the bracket is connected to the base, and thereby control the electronic apparatus to be in the first use mode. The first detection signal may be transmitted to the information processing unit within the body in a wireless transmission way.

Second situation: when the first detection unit is located within base, the first detection information may be a contact signal sent by the contact type sensor. Once a contact is detected by the first detection unit such as the contact type sensor, a contact signal will be sent, and the first detection unit within the base will transmit the first detection signal to the information processing unit through connection wires within the bracket; correspondingly, the information processing unit receives the contact signal to determine that the bracket is connected to the base, and thereby control the electronic apparatus to be in the first use mode. The first detection signal may be transmitted to the information processing unit within the body in a wireless transmission way.

Third situation: when the first detection unit is located within the body, the first detection unit may be a switch. At this time, once it has detected that the switch is turned on by a user, a switch signal will be sent as a first detection signal, which will be transmitted to the information processing unit; correspondingly, the information processing unit receives the first detection signal, to determine that the bracket is connected to the base, and thereby control the electronic apparatus to be in the first use mode.

In embodiments of the present application, the body of the electronic apparatus comprises a first electronic device; the base of the electronic apparatus comprises a second electronic device, which is of the same type as the first electronic device.

When the body is connected to the base via the bracket, the second electronic device in the base is configured to enhance the first electronic device in the body via the bracket so that a performance of the electronic apparatus in the first use mode is higher than that of the electronic apparatus in the second use mode.

Each of the first electronic device and the second electronic device may include at least one of a power supply, a CPU, a GPU and an audio output unit.

Specifically, the power supply may be an AC power supply, which supplies electric power to the electronic apparatus through power lines; or the power supply may be a charging power supply. The information processing unit may be a CPU.

Following, situations where this embodiment is implemented will be described hereafter.

In a first situation, when the second electronic device is a power supply, the electronic apparatus entries into a first use mode to control and turn on the power supply within the base. At this time, the power supply within the body may be turned off or not be turned off. As such, electrical performance of the electronic apparatus may be improved. Specifically, duration of use of the electronic apparatus is increased, thereby avoiding the problem that the user worries about running out of power when the electronic apparatus is used in a mobile way.

In a second situation, when the second electronic device is a CPU or GPU, the electronic apparatus entries into a first use mode to control and turn on the CPU within the base. At this time, information is directly sent by the information processing unit within the body to the CPU within the base for processing, that is, the information processing unit within the body is only used as a forwarding unit, and operations are completely controlled by the CPU within the base; or the CPU within the base may be used as another process unit to cooperate with the information processing unit within the body; or the GPU within the base is used for processing all image operations, that is, the information processing unit within the body is configured to transmit all of information about image operations to the GPU within the base for processing, and receive response information returning back from the GPU. It can be understood that the information transmission way between the information processing unit within the body and the CPU or GPU may be wireless transmission or wire transmission. As such, processing performance of the electronic apparatus can be improved.

In a third situation, when first electronic device and the second electronic device are audio output units, the electronic apparatus entries in a first use mode to play audio information through both of the first electronic device and the second electronic device, thereby a multi-channel sound effect can be achieved. In this situation, audio information is transmitted by the information processing unit within body to second electronic device, the second electronic device is controlled to play the audio information.

It can be understood that, the above three situations may be implemented simultaneously, or two of the three situations may be implemented simultaneously. For example, when the electronic apparatus is in the first use state, the power supply and the CPU within the base are controlled and turned on; or when the electronic apparatus is in the first use state, the power supply and the audio output unit within the base are controlled and turned on; or when the electronic apparatus is in the first use state, the power supply, the CPU, the GPU and the audio output unit within the base are controlled and turned on.

Also, the base may be provided with one or more interfaces for connecting one or more peripheral equipments, such as a mouse, a keyboard, a U disc, or the like. Specifically, when the electronic apparatus is in the first use mode, a mouse and a keyboard may be connected through one or more interfaces by a user, as such, use comfort of the electronic apparatus can be upgraded.

Accordingly, when the electronic apparatus is used, not only the body can be supported by the bracket, but also the body can be connected to the base via the bracket according to use demands, so that the all-in-one computer can be laid flat on a platform, thereby the electronic apparatus can not only satisfy use situations requiring convenience and mobility, but also ensure that an angle of view in operation of the electronic apparatus is controlled to comply with requirements of comfort of the user.

Seventh Embodiment

This embodiment provides an electronic apparatus comprising a body, a bracket and a rotary connection device.

The bracket is connected to the body via the rotary connection device.

The bracket is configured to support the body on a supporting surface so that the electronic apparatus is in a second use mode.

The bracket is further configured to connect the body with the base and support the body on the supporting surface in cooperation with the base so that the electronic apparatus is in a first use mode.

The electronic apparatus of this embodiment may be shown in FIG. 2, the bracket 22 is connected to a lower portion of the body 21 via the rotary connection device; the bracket 22 deploys downwards, the bracket is used to support the body on a supporting surface so that the electronic apparatus is in the second use mode; or, the electronic apparatus of this embodiment may be shown in FIG. 3, in which the bracket 32 is connected at one side of the lower portion of the body 31, and the bracket is used to support the body on a supporting surface so that the electronic apparatus is in the second use mode; or, the electronic apparatus of this embodiment may be shown in FIG. 4, in which the bracket 42 is connected to a middle portion of an upper portion of the body 41 via the rotary connection device, the second end of the bracket 42 opens upwards, and the bracket is used to support the body on a supporting surface so that the electronic apparatus is in the second use mode.

The bracket is further used to connect the body with the base, and support the body on the supporting surface in cooperation with the base so that the electronic apparatus is in the first use mode as shown in FIG. 1.

The electronic apparatus according to this embodiment may be applied in the following use situations: when a user is going out, or wishes to use an electronic apparatus in a portable way, only the body and the bracket of the electronic apparatus are used; at this time, the electronic apparatus is controlled to be in a second use state. As such, mobility can be ensured for the user, and the electronic apparatus can be used conveniently; or when the user wants to use the electronic apparatus in a fixed place, the body is connected to the base via the bracket, and the electronic apparatus is controlled to be in a first use state so that it can be used stably.

Accordingly, when the electronic apparatus is used, not only the body can be supported by the bracket, but also the body can be connected to the base via the bracket according to use demands, so that the electronic apparatus has two use modes, thereby the electronic apparatus can not only satisfy use situations requiring convenience and mobility, but also ensure that an angle of view in operation of the electronic apparatus is controlled to comply with requirements of comfort of the user.

It should be understood that in several embodiments described in the present application, the disclosed apparatus may be implemented in other ways. The embodiments of the apparatus as described above are only illustrative, and may be combined in other ways in practice. For example, some features may be omitted. Further, coupling, direct coupling or communication connection among respective constituting parts shown or discussed may be achieved by several interfaces, and the indirect coupling or communication connection between apparatuses or units may be electrical, mechanical or in other forms.

The above units described as separate parts may be or not be physically separated from each other; the part shown as a unit may be or not be a physical unit; objects of the embodiments may be achieved by selecting some or all of the units as required.

The above description is only used to illustrate specific embodiments of the present application, and protective scope of the present application is not limited to this. Modifications, equivalent alternatives and improvements made within principles and spirit of the present application are included within protective scope of the present application, the scope of which is defined in the claims and their equivalents.

What is claimed is:

1. An electronic apparatus comprising:
   a body;
   a rotary connection device;
   a bracket rotatably connected to a middle portion of an upper portion of the body via the rotary connection device; and
   a base detachably connected to the body via the bracket;
   wherein a connection portion on the base is formed as an annular locking groove around an outside periphery of a top portion of the base, and the bracket is formed with a circular hole at an end of the bracket away from the body,
   wherein the bracket is connected to the connection portion through engaging of an inner wall of the circular hole to the annular locking groove,
   wherein the electronic apparatus has a first use mode in which the body is connected to the base via the bracket; and a second use mode which is different from the first use mode and in which the base is detached from the bracket,
   wherein in the second use mode, the rotary connection device provides a friction force so as to maintain the bracket at a first preset angle relative to the body, and the friction force provides a supporting force by which the bracket is maintained at the first preset angle relative to the body; and
   wherein in the first use mode, the rotary connection device provides the friction force so as to maintain the bracket at a second preset angle relative to the body, the friction force provides supporting force by which the bracket is maintained at the second preset angle relative to the body.

2. The electronic apparatus according to claim 1, wherein the bracket deploys at the first preset angle relative to the body for supporting the body on a supporting surface in the second use mode; and
   the bracket deploys at the second preset angle relative to the body for supporting the body on the supporting surface in cooperation with the base in the first use mode.

3. The electronic apparatus according to claim 2, wherein the bracket deploys at the first preset angle or the second preset angle relative to the body by means of the rotary connection device.

4. The electronic apparatus according to claim 3, wherein in the first use mode, the rotary connection device provides the friction force to maintain the bracket at the second preset angle relative to the body.

5. The electronic apparatus according to claim 4, wherein in the first use mode, the bracket provides the supporting force to maintain the bracket at the second preset angle relative to the body, the direction of the supporting force being perpendicular to the direction of friction force.

6. The electronic apparatus according to claim 1, wherein a center of gravity of the whole electronic apparatus falls within a bottom area of the base in the first use mode.

7. The electronic apparatus according to claim 2, wherein a center of gravity of the whole electronic apparatus falls within a bottom area of the base in the first use mode.

8. The electronic apparatus according to claim 3, wherein a center of gravity of the whole electronic apparatus falls within a bottom area of the base in the first use mode.

9. The electronic apparatus according to claim 4, wherein a center of gravity of the whole electronic apparatus falls within a bottom area of the base in the first use mode.

10. The electronic apparatus according to claim 5, wherein a center of gravity of the whole electronic apparatus falls within a bottom area of the base in the first use mode.

11. The electronic apparatus according to claim 1, wherein
the electronic apparatus further comprises a first detection unit and an information processing unit; wherein,
the first detection unit obtains a first detection information, which is used to determine whether or not the bracket is detached from the base in the electronic apparatus; and
the information processing unit controls the electronic apparatus to be in the second use mode in the case that the first detection information indicates that the bracket is detached from the base, and to control the electronic apparatus to be in the first use mode in the case that the first detection information indicates that the bracket is connected to the base.

12. An electronic apparatus comprising:
a body;
a rotary connection device; and
a bracket rotatably connected to a middle portion of an upper portion of the body via the rotary connection device;
wherein in a first use mode, the bracket detachably connects the body to a base and support the body on a supporting surface in cooperation with the base; and in a second use mode, the bracket supports the body on the supporting surface by the bracket;
wherein a connection portion on the base is formed as an annular locking groove around an outside periphery of a top portion of the base, and the bracket is formed with a circular hole at an end of the bracket away from the body,
wherein the bracket is connected to the connection portion through engaging of an inner wall of the circular hole to the annular locking groove,
wherein the first use mode in which the body is connected to the base via the bracket; and the second use mode which is different from the first use mode and in which the base is detached from the bracket,
wherein in the second use mode, the rotary connection device provides a friction force so as to maintain the bracket at a first preset angle relative to the body, and the friction force provides the supporting force by which the bracket is maintained at the first preset angle relative to the body; and
wherein in the first use mode, the rotary connection device provides the friction force so as to maintain the bracket at a second preset angle relative to the body, the friction force provides supporting force by which the bracket is maintained at the second preset angle relative to the body.

* * * * *